(12) United States Patent
Furukawa et al.

(10) Patent No.: US 8,797,599 B2
(45) Date of Patent: Aug. 5, 2014

(54) IMAGE PROCESSING DEVICE AND IMAGE PROCESSING METHOD

(71) Applicant: Brother Kogyo Kabushiki Kaisha, Nagoya (JP)

(72) Inventors: Toshio Furukawa, Nagoya (JP); Yuichi Matsushita, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/842,566

(22) Filed: Mar. 15, 2013

(65) Prior Publication Data

US 2013/0286441 A1    Oct. 31, 2013

(30) Foreign Application Priority Data

Apr. 27, 2012  (JP) .................................. 2012-103334

(51) Int. Cl.
*H04N 1/60* (2006.01)
*H04N 1/40* (2006.01)

(52) U.S. Cl.
USPC ......... 358/3.13; 358/3.01; 358/3.16; 358/3.2; 358/536; 358/1.9; 382/237

(58) Field of Classification Search
None
See application file for complete search history.

(56) References Cited

U.S. PATENT DOCUMENTS

| | | | |
|---|---|---|---|
| 6,836,346 B2 * | 12/2004 | Yoshizawa et al. | ............. 358/1.9 |
| 2004/0218221 A1 * | 11/2004 | Hirano et al. | ................ 358/3.06 |
| 2010/0021186 A1 | 1/2010 | Okano | |

FOREIGN PATENT DOCUMENTS

JP      2010-032722 A      2/2010

* cited by examiner

*Primary Examiner* — Quang N Vo
(74) *Attorney, Agent, or Firm* — Merchant & Gould PC

(57) ABSTRACT

There is provided an image processing device which converts multi-gradation pixels configuring a multi-gradation image of image data to be used in a color image forming apparatus, into unit dither patterns. The image forming apparatus includes photosensitive members on which developer images are formed by supplying developer to electrostatic latent images, and an exposure device which exposes the photosensitive members. The developer images on the photosensitive members are transferred to a transferred medium which is moved while contacting the photosensitive members. The image processing device includes a processing unit which converts a multi-gradation pixel of a first color into unit dither patterns, each unit dither pattern consisting of a first line extending in a predetermined direction and a second line extending in a direction intersecting with the first line when a gradation value of the multi-gradation pixel is within a predetermined range.

4 Claims, 14 Drawing Sheets

*FIG. 5*

| 1 | 65 | 81 | 97 | 14 | 78 | 94 | 110 | 7 | 71 | 87 | 103 | 12 | 76 | 92 | 108 |
|---|---|---|---|---|---|---|---|---|---|---|---|---|---|---|---|
| 17 | 113 | 129 | 145 | 30 | 126 | 142 | 158 | 23 | 119 | 135 | 151 | 28 | 124 | 140 | 156 |
| 33 | 161 | 177 | 193 | 46 | 174 | 190 | 206 | 39 | 167 | 183 | 199 | 44 | 172 | 188 | 204 |
| 49 | 209 | 225 | 241 | 62 | 222 | 238 | 254 | 55 | 215 | 231 | 247 | 60 | 220 | 236 | 252 |
| 9 | 73 | 89 | 105 | 2 | 66 | 82 | 98 | 15 | 79 | 95 | 111 | 8 | 72 | 88 | 104 |
| 25 | 121 | 137 | 153 | 18 | 114 | 130 | 146 | 31 | 127 | 143 | 159 | 24 | 120 | 136 | 152 |
| 41 | 169 | 185 | 201 | 34 | 162 | 178 | 194 | 47 | 175 | 191 | 207 | 40 | 168 | 184 | 200 |
| 57 | 217 | 233 | 249 | 50 | 210 | 226 | 242 | 63 | 223 | 239 | 255 | 56 | 216 | 232 | 248 |
| 5 | 69 | 85 | 101 | 10 | 74 | 90 | 106 | 3 | 67 | 83 | 99 | 16 | 80 | 96 | 112 |
| 21 | 117 | 133 | 149 | 26 | 122 | 138 | 154 | 19 | 115 | 131 | 147 | 32 | 128 | 144 | 160 |
| 37 | 165 | 181 | 197 | 42 | 170 | 186 | 202 | 35 | 163 | 179 | 195 | 48 | 176 | 192 | 208 |
| 53 | 213 | 229 | 245 | 58 | 218 | 234 | 250 | 51 | 211 | 227 | 243 | 64 | 224 | 240 | 255 |
| 13 | 77 | 93 | 109 | 6 | 70 | 86 | 102 | 11 | 75 | 91 | 107 | 4 | 68 | 84 | 100 |
| 29 | 125 | 141 | 157 | 22 | 118 | 134 | 150 | 27 | 123 | 139 | 155 | 20 | 116 | 132 | 148 |
| 45 | 173 | 189 | 205 | 38 | 166 | 182 | 198 | 43 | 171 | 187 | 203 | 36 | 164 | 180 | 196 |
| 61 | 221 | 237 | 253 | 54 | 214 | 230 | 246 | 59 | 219 | 235 | 251 | 52 | 212 | 228 | 244 |

FIG. 6

| 1 | 65 | 81 | 97 | 14 | 78 | 94 | 110 | 7 | 71 | 87 | 103 | 12 | 76 | 92 | 108 |
|---|---|---|---|---|---|---|---|---|---|---|---|---|---|---|---|
| 17 | 113 | 129 | 145 | 30 | 126 | 142 | 158 | 23 | 119 | 135 | 151 | 28 | 124 | 140 | 156 |
| 33 | 161 | 177 | 193 | 46 | 174 | 190 | 206 | 39 | 167 | 183 | 199 | 44 | 172 | 188 | 204 |
| 49 | 209 | 225 | 241 | 62 | 222 | 238 | 254 | 55 | 215 | 231 | 247 | 60 | 220 | 236 | 252 |
| 9 | 73 | 89 | 105 | 2 | 66 | 82 | 98 | 15 | 79 | 95 | 111 | 8 | 72 | 88 | 104 |
| 25 | 121 | 137 | 153 | 18 | 114 | 130 | 146 | 31 | 127 | 143 | 159 | 24 | 120 | 136 | 152 |
| 41 | 169 | 185 | 201 | 34 | 162 | 178 | 194 | 47 | 175 | 191 | 207 | 40 | 168 | 184 | 200 |
| 57 | 217 | 233 | 249 | 50 | 210 | 226 | 242 | 63 | 223 | 239 | 255 | 56 | 216 | 232 | 248 |
| 5 | 69 | 85 | 101 | 10 | 74 | 90 | 106 | 3 | 67 | 83 | 99 | 16 | 80 | 96 | 112 |
| 21 | 117 | 133 | 149 | 26 | 122 | 138 | 154 | 19 | 115 | 131 | 147 | 32 | 128 | 144 | 160 |
| 37 | 165 | 181 | 197 | 42 | 170 | 186 | 202 | 35 | 163 | 179 | 195 | 48 | 176 | 192 | 208 |
| 53 | 213 | 229 | 245 | 58 | 218 | 234 | 250 | 51 | 211 | 227 | 243 | 64 | 224 | 240 | 255 |
| 13 | 77 | 93 | 109 | 6 | 70 | 86 | 102 | 11 | 75 | 91 | 107 | 4 | 68 | 84 | 100 |
| 29 | 125 | 141 | 157 | 22 | 118 | 134 | 150 | 27 | 123 | 139 | 155 | 20 | 116 | 132 | 148 |
| 45 | 173 | 189 | 205 | 38 | 166 | 182 | 198 | 43 | 171 | 187 | 203 | 36 | 164 | 180 | 196 |
| 61 | 221 | 237 | 253 | 54 | 214 | 230 | 246 | 59 | 219 | 235 | 251 | 52 | 212 | 228 | 244 |

FIG. 7

| 1 | 65 | 81 | 97 | 14 | 78 | 94 | 110 | 7 | 71 | 87 | 103 | 12 | 76 | 92 | 108 |
|---|---|---|---|---|---|---|---|---|---|---|---|---|---|---|---|
| 17 | 113 | 129 | 145 | 30 | 126 | 142 | 158 | 23 | 119 | 135 | 151 | 28 | 124 | 140 | 156 |
| 33 | 161 | 177 | 193 | 46 | 174 | 190 | 206 | 39 | 167 | 183 | 199 | 44 | 172 | 188 | 204 |
| 49 | 209 | 225 | 241 | 62 | 222 | 238 | 254 | 55 | 215 | 231 | 247 | 60 | 220 | 236 | 252 |
| 9 | 73 | 89 | 105 | 2 | 66 | 82 | 98 | 15 | 79 | 95 | 111 | 8 | 72 | 88 | 104 |
| 25 | 121 | 137 | 153 | 18 | 114 | 130 | 146 | 31 | 127 | 143 | 159 | 24 | 120 | 136 | 152 |
| 41 | 169 | 185 | 201 | 34 | 162 | 178 | 194 | 47 | 175 | 191 | 207 | 40 | 168 | 184 | 200 |
| 57 | 217 | 233 | 249 | 50 | 210 | 226 | 242 | 63 | 223 | 239 | 255 | 56 | 216 | 232 | 248 |
| 5 | 69 | 85 | 101 | 10 | 74 | 90 | 106 | 3 | 67 | 83 | 99 | 16 | 80 | 96 | 112 |
| 21 | 117 | 133 | 149 | 26 | 122 | 138 | 154 | 19 | 115 | 131 | 147 | 32 | 128 | 144 | 160 |
| 37 | 165 | 181 | 197 | 42 | 170 | 186 | 202 | 35 | 163 | 179 | 195 | 48 | 176 | 192 | 208 |
| 53 | 213 | 229 | 245 | 58 | 218 | 234 | 250 | 51 | 211 | 227 | 243 | 64 | 224 | 240 | 255 |
| 13 | 77 | 93 | 109 | 6 | 70 | 86 | 102 | 11 | 75 | 91 | 107 | 4 | 68 | 84 | 100 |
| 29 | 125 | 141 | 157 | 22 | 118 | 134 | 150 | 27 | 123 | 139 | 155 | 20 | 116 | 132 | 148 |
| 45 | 173 | 189 | 205 | 38 | 166 | 182 | 198 | 43 | 171 | 187 | 203 | 36 | 164 | 180 | 196 |
| 61 | 221 | 237 | 253 | 54 | 214 | 230 | 246 | 59 | 219 | 235 | 251 | 52 | 212 | 228 | 244 |

| 1 | 17 | 33 | 49 | 9 | 25 | 41 | 57 | 5 | 21 | 37 | 53 | 13 | 29 | 45 | 61 |
|---|---|---|---|---|---|---|---|---|---|---|---|---|---|---|---|
| 65 | 113 | 161 | 209 | 73 | 121 | 169 | 217 | 69 | 117 | 165 | 213 | 77 | 125 | 173 | 221 |
| 81 | 129 | 177 | 225 | 89 | 137 | 185 | 233 | 85 | 133 | 181 | 229 | 93 | 141 | 189 | 237 |
| 97 | 145 | 193 | 241 | 105 | 153 | 201 | 249 | 101 | 149 | 197 | 245 | 109 | 157 | 205 | 253 |
| 14 | 30 | 46 | 62 | 2 | 18 | 34 | 50 | 10 | 26 | 42 | 58 | 6 | 22 | 38 | 54 |
| 78 | 126 | 174 | 222 | 66 | 114 | 162 | 210 | 74 | 122 | 170 | 218 | 70 | 118 | 166 | 214 |
| 94 | 142 | 190 | 238 | 82 | 130 | 178 | 226 | 90 | 138 | 186 | 234 | 86 | 134 | 182 | 230 |
| 110 | 158 | 206 | 254 | 98 | 146 | 194 | 242 | 106 | 154 | 202 | 250 | 102 | 150 | 198 | 246 |
| 7 | 23 | 39 | 55 | 15 | 31 | 47 | 63 | 3 | 19 | 35 | 51 | 11 | 27 | 43 | 59 |
| 71 | 119 | 167 | 215 | 79 | 127 | 175 | 223 | 67 | 115 | 163 | 211 | 75 | 123 | 171 | 219 |
| 87 | 135 | 183 | 231 | 95 | 143 | 191 | 239 | 83 | 131 | 179 | 227 | 91 | 139 | 187 | 235 |
| 103 | 151 | 199 | 247 | 111 | 159 | 207 | 255 | 99 | 147 | 195 | 243 | 107 | 155 | 203 | 251 |
| 12 | 28 | 44 | 60 | 8 | 24 | 40 | 56 | 16 | 32 | 48 | 64 | 4 | 20 | 36 | 52 |
| 76 | 124 | 172 | 220 | 72 | 120 | 168 | 216 | 80 | 128 | 176 | 224 | 68 | 116 | 164 | 212 |
| 92 | 140 | 188 | 236 | 88 | 136 | 184 | 232 | 96 | 144 | 192 | 240 | 84 | 132 | 180 | 228 |
| 108 | 156 | 204 | 252 | 104 | 152 | 200 | 248 | 112 | 160 | 208 | 255 | 100 | 148 | 196 | 244 |

FIG. 12A

| 1 | 2 | 3 | 4 |
|---|---|---|---|
| 5 | 8 | 11 | 14 |
| 6 | 9 | 12 | 15 |
| 7 | 10 | 13 | 16 |

FIG. 12B

| 1 | 2 | 3 | 4 |
|---|---|---|---|
| 5 | 8 | 11 | 14 |
| 6 | 9 | 12 | 15 |
| 7 | 10 | 13 | 16 |

FIG. 12C

| 1 | 2 | 3 | 4 |
|---|---|---|---|
| 5 | 8 | 11 | 14 |
| 6 | 9 | 12 | 15 |
| 7 | 10 | 13 | 16 |

FIG. 13

| 1  | 221 | 189 | 157 | 14 | 214 | 182 | 150 | 7  | 219 | 187 | 155 | 12 | 212 | 180 | 148 |
|----|-----|-----|-----|----|-----|-----|-----|----|-----|-----|-----|----|-----|-----|-----|
| 17 | 65  | 237 | 205 | 30 | 78  | 230 | 198 | 23 | 71  | 235 | 203 | 28 | 76  | 228 | 196 |
| 33 | 113 | 81  | 253 | 46 | 126 | 94  | 246 | 39 | 119 | 87  | 251 | 44 | 124 | 92  | 244 |
| 49 | 161 | 129 | 97  | 62 | 174 | 142 | 110 | 55 | 167 | 135 | 103 | 60 | 172 | 140 | 108 |
| 9  | 209 | 177 | 145 | 2  | 222 | 190 | 158 | 15 | 215 | 183 | 151 | 8  | 220 | 188 | 156 |
| 25 | 73  | 225 | 193 | 18 | 66  | 238 | 206 | 31 | 79  | 231 | 199 | 24 | 72  | 236 | 204 |
| 41 | 121 | 89  | 241 | 34 | 114 | 82  | 254 | 47 | 127 | 95  | 247 | 40 | 120 | 88  | 252 |
| 57 | 169 | 137 | 105 | 50 | 162 | 130 | 98  | 63 | 175 | 143 | 111 | 56 | 168 | 136 | 104 |
| 5  | 217 | 185 | 153 | 10 | 210 | 178 | 146 | 3  | 223 | 191 | 159 | 16 | 216 | 184 | 152 |
| 21 | 69  | 233 | 201 | 26 | 74  | 226 | 194 | 19 | 67  | 239 | 207 | 32 | 80  | 232 | 200 |
| 37 | 117 | 85  | 249 | 42 | 122 | 90  | 242 | 35 | 115 | 83  | 255 | 48 | 128 | 96  | 248 |
| 53 | 165 | 133 | 101 | 58 | 170 | 138 | 106 | 51 | 163 | 131 | 99  | 64 | 176 | 144 | 112 |
| 13 | 213 | 181 | 149 | 6  | 218 | 186 | 154 | 11 | 211 | 179 | 147 | 4  | 224 | 192 | 160 |
| 29 | 77  | 229 | 197 | 22 | 70  | 234 | 202 | 27 | 75  | 227 | 195 | 20 | 68  | 240 | 208 |
| 45 | 125 | 93  | 245 | 38 | 118 | 86  | 250 | 43 | 123 | 91  | 243 | 36 | 116 | 84  | 255 |
| 61 | 173 | 141 | 109 | 54 | 166 | 134 | 102 | 59 | 171 | 139 | 107 | 52 | 164 | 132 | 100 |

FIG. 14A

| 1 | 14 | 12 | 10 |
|---|----|----|----|
| 2 | 5  | 15 | 13 |
| 3 | 8  | 6  | 16 |
| 4 | 11 | 9  | 7  |

FIG. 14B

| 1 | 14 | 12 | 11 |
|---|----|----|----|
| 2 | 5  | 15 | 13 |
| 3 | 8  | 6  | 16 |
| 4 | 11 | 9  | 7  |

FIG. 14C

| 7 | 14 | 12 | 10 |
|---|----|----|----|
| 2 | 5  | 15 | 13 |
| 3 | 8  | 6  | 16 |
| 4 | 11 | 9  | 7  |

| 1 | 1 | 1 | 2  | 24 | 36  | 42  | 48  | 54  | 60  | 66  | 72  | 78  | 84  | 90  | 96  | 102 | 108 | 114 | 120 | 126 | 132 | 138 | 144 |
| 1 | 1 | 1 | 5  | 28 | 150 | 156 | 162 | 168 | 174 | 180 | 186 | 192 | 198 | 204 | 210 | 216 | 222 | 228 | 234 | 240 | 246 | 252 | 254 |
| 1 | 1 | 1 | 9  | 32 | 38  | 44  | 50  | 56  | 62  | 68  | 74  | 80  | 86  | 92  | 98  | 104 | 110 | 116 | 122 | 128 | 134 | 140 | 146 |
| 1 | 1 | 1 | 12 | 26 | 152 | 158 | 164 | 170 | 176 | 182 | 188 | 194 | 200 | 206 | 212 | 218 | 224 | 230 | 236 | 242 | 248 | 253 | 255 |
| 1 | 1 | 1 | 16 | 30 | 40  | 46  | 52  | 58  | 64  | 70  | 76  | 82  | 88  | 94  | 100 | 106 | 112 | 118 | 124 | 130 | 136 | 142 | 148 |
| 1 | 1 | 1 | 20 | 34 | 154 | 160 | 166 | 172 | 178 | 184 | 190 | 196 | 202 | 208 | 214 | 220 | 226 | 232 | 238 | 244 | 250 | 254 | 255 |
| 1 | 1 | 1 | 3  | 25 | 37  | 43  | 49  | 55  | 61  | 67  | 73  | 79  | 85  | 91  | 97  | 103 | 109 | 115 | 121 | 127 | 133 | 139 | 145 |
| 1 | 1 | 1 | 7  | 29 | 151 | 157 | 163 | 169 | 175 | 181 | 187 | 193 | 199 | 205 | 211 | 217 | 223 | 229 | 235 | 241 | 247 | 252 | 254 |
| 1 | 1 | 1 | 10 | 33 | 39  | 45  | 51  | 57  | 63  | 69  | 75  | 81  | 87  | 93  | 99  | 105 | 111 | 117 | 123 | 129 | 135 | 141 | 147 |
| 1 | 1 | 1 | 14 | 27 | 153 | 159 | 165 | 171 | 177 | 183 | 189 | 195 | 201 | 207 | 213 | 219 | 225 | 231 | 237 | 243 | 249 | 253 | 255 |
| 1 | 1 | 1 | 18 | 31 | 41  | 47  | 53  | 59  | 65  | 71  | 77  | 83  | 89  | 95  | 101 | 107 | 113 | 119 | 125 | 131 | 137 | 143 | 149 |
| 1 | 1 | 1 | 22 | 35 | 155 | 161 | 167 | 173 | 179 | 185 | 191 | 197 | 203 | 209 | 215 | 221 | 227 | 233 | 239 | 245 | 251 | 254 | 255 |

| 1 | 1 | 1 | 14 | 27 | 153 | 159 | 165 | 171 | 177 | 183 | 189 | 195 | 201 | 207 | 213 | 219 | 225 | 231 | 237 | 243 | 249 | 253 | 255 |
| 1 | 1 | 1 | 18 | 31 | 41  | 47  | 53  | 59  | 65  | 71  | 77  | 83  | 89  | 95  | 101 | 107 | 113 | 119 | 125 | 131 | 137 | 143 | 149 |
| 1 | 1 | 1 | 22 | 35 | 155 | 161 | 167 | 173 | 179 | 185 | 191 | 197 | 203 | 209 | 215 | 221 | 227 | 233 | 239 | 245 | 251 | 254 | 255 |
| 1 | 1 | 1 | 2  | 24 | 36  | 42  | 48  | 54  | 60  | 66  | 72  | 78  | 84  | 90  | 96  | 102 | 108 | 114 | 120 | 126 | 132 | 138 | 144 |
| 1 | 1 | 1 | 5  | 28 | 150 | 156 | 162 | 168 | 174 | 180 | 186 | 192 | 198 | 204 | 210 | 216 | 222 | 228 | 234 | 240 | 246 | 252 | 254 |
| 1 | 1 | 1 | 9  | 32 | 38  | 44  | 50  | 56  | 62  | 68  | 74  | 80  | 86  | 92  | 98  | 104 | 110 | 116 | 122 | 128 | 134 | 140 | 146 |
| 1 | 1 | 1 | 12 | 26 | 152 | 158 | 164 | 170 | 176 | 182 | 188 | 194 | 200 | 206 | 212 | 218 | 224 | 230 | 236 | 242 | 248 | 253 | 255 |
| 1 | 1 | 1 | 16 | 30 | 40  | 46  | 52  | 58  | 64  | 70  | 76  | 82  | 88  | 94  | 100 | 106 | 112 | 118 | 124 | 130 | 136 | 142 | 148 |
| 1 | 1 | 1 | 20 | 34 | 154 | 160 | 166 | 172 | 178 | 184 | 190 | 196 | 202 | 208 | 214 | 220 | 226 | 232 | 238 | 244 | 250 | 254 | 255 |
| 1 | 1 | 1 | 3  | 25 | 37  | 43  | 49  | 55  | 61  | 67  | 73  | 79  | 85  | 91  | 97  | 103 | 109 | 115 | 121 | 127 | 133 | 139 | 145 |
| 1 | 1 | 1 | 7  | 29 | 151 | 157 | 163 | 169 | 175 | 181 | 187 | 193 | 199 | 205 | 211 | 217 | 223 | 229 | 235 | 241 | 247 | 252 | 254 |
| 1 | 1 | 1 | 10 | 33 | 39  | 45  | 51  | 57  | 63  | 69  | 75  | 81  | 87  | 93  | 99  | 105 | 111 | 117 | 123 | 129 | 135 | 141 | 147 |

FIG. 16

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | 6 | 63 | 3 | 32 | 5 | 47 | 16 | 1 | 7 | 70 | 3 | 38 | 5 | 54 | 23 |
| 1 | 39 | 119 | 87 | 151 | 95 | 135 | 111 | 1 | 46 | 126 | 94 | 158 | 102 | 142 | 118 |
| 1 | 2 | 71 | 175 | 223 | 167 | 207 | 191 | 1 | 2 | 78 | 182 | 226 | 174 | 214 | 198 |
| 1 | 24 | 127 | 199 | 240 | 248 | 231 | 244 | 1 | 31 | 134 | 206 | 243 | 249 | 234 | 245 |
| 1 | 4 | 79 | 159 | 227 | 254 | 251 | 253 | 1 | 4 | 86 | 166 | 230 | 254 | 251 | 253 |
| 1 | 55 | 143 | 215 | 246 | 250 | 254 | 255 | 1 | 62 | 150 | 222 | 247 | 250 | 254 | 255 |
| 1 | 8 | 103 | 183 | 235 | 252 | 255 | 255 | 1 | 15 | 110 | 190 | 239 | 252 | 255 | 255 |
| 1 | 1 | 1 | 1 | 1 | 1 | 1 | 1 | 1 | 1 | 1 | 1 | 1 | 1 | 1 | 1 |
| 1 | 7 | 67 | 3 | 35 | 5 | 51 | 20 | 1 | 6 | 64 | 3 | 33 | 5 | 48 | 17 |
| 1 | 43 | 123 | 91 | 155 | 99 | 139 | 115 | 1 | 40 | 120 | 88 | 152 | 96 | 136 | 112 |
| 1 | 2 | 75 | 179 | 225 | 171 | 211 | 195 | 1 | 2 | 72 | 176 | 223 | 168 | 208 | 192 |
| 1 | 28 | 131 | 203 | 242 | 249 | 233 | 245 | 1 | 25 | 128 | 200 | 240 | 248 | 231 | 244 |
| 1 | 4 | 83 | 163 | 229 | 254 | 251 | 253 | 1 | 4 | 80 | 160 | 227 | 254 | 251 | 253 |
| 1 | 59 | 147 | 219 | 247 | 250 | 254 | 255 | 1 | 56 | 144 | 216 | 246 | 250 | 254 | 255 |
| 1 | 12 | 107 | 187 | 237 | 252 | 255 | 255 | 1 | 9 | 104 | 184 | 235 | 252 | 255 | 255 |
| 1 | 1 | 1 | 1 | 1 | 1 | 1 | 1 | 1 | 1 | 1 | 1 | 1 | 1 | 1 | 1 |
| 1 | 6 | 65 | 3 | 34 | 5 | 49 | 18 | 1 | 7 | 68 | 3 | 36 | 5 | 52 | 21 |
| 1 | 41 | 121 | 89 | 153 | 97 | 137 | 113 | 1 | 44 | 124 | 92 | 156 | 100 | 140 | 116 |
| 1 | 2 | 73 | 177 | 224 | 169 | 209 | 193 | 1 | 2 | 76 | 180 | 225 | 172 | 212 | 196 |
| 1 | 26 | 129 | 201 | 241 | 248 | 232 | 244 | 1 | 29 | 132 | 204 | 242 | 249 | 233 | 245 |
| 1 | 4 | 81 | 161 | 228 | 254 | 251 | 253 | 1 | 4 | 84 | 164 | 229 | 254 | 251 | 253 |
| 1 | 57 | 145 | 217 | 246 | 250 | 254 | 255 | 1 | 60 | 148 | 220 | 247 | 250 | 254 | 255 |
| 1 | 10 | 105 | 185 | 236 | 252 | 255 | 255 | 1 | 13 | 108 | 188 | 237 | 252 | 255 | 255 |
| 1 | 1 | 1 | 1 | 1 | 1 | 1 | 1 | 1 | 1 | 1 | 1 | 1 | 1 | 1 | 1 |
| 1 | 7 | 69 | 3 | 37 | 5 | 53 | 22 | 1 | 6 | 66 | 3 | 35 | 5 | 50 | 19 |
| 1 | 45 | 125 | 93 | 157 | 101 | 141 | 117 | 1 | 42 | 122 | 90 | 154 | 98 | 138 | 114 |
| 1 | 2 | 77 | 181 | 226 | 173 | 213 | 197 | 1 | 2 | 74 | 178 | 224 | 170 | 210 | 194 |
| 1 | 30 | 133 | 205 | 243 | 249 | 234 | 245 | 1 | 27 | 130 | 202 | 241 | 248 | 232 | 244 |
| 1 | 4 | 85 | 165 | 230 | 254 | 251 | 253 | 1 | 4 | 82 | 162 | 228 | 254 | 251 | 253 |
| 1 | 61 | 149 | 221 | 247 | 250 | 254 | 255 | 1 | 58 | 146 | 218 | 246 | 250 | 254 | 255 |
| 1 | 14 | 109 | 189 | 239 | 252 | 255 | 255 | 1 | 11 | 106 | 186 | 236 | 252 | 255 | 255 |

IMAGE PROCESSING DEVICE AND IMAGE PROCESSING METHOD

CROSS-REFERENCE TO RELATED APPLICATION

This application claims priority from Japanese Patent Application No. 2012-103334, filed on Apr. 27, 2012, the entire subject matter of which is incorporated herein by reference.

TECHNICAL FIELD

Aspects of the present invention relate to an image processing device and an image processing method for converting multi-gradation pixels which configure a multi-gradation image of image data to be used in a color image forming apparatus, into unit dither patterns.

There has been known a tandem-type image forming apparatus such as color printer in which photosensitive drums corresponding to respective colors of yellow, magenta, cyan and black are arranged side by side in a conveyance direction of a sheet (see, for example, P JP-A-2010-32722). In this image forming apparatus, transfer rollers are provided in correspondence to the respective photosensitive drums, and a transfer bias is applied to the transfer rollers, so that toner on the photosensitive drums is transferred to the sheet when the sheet is conveyed between the photosensitive drums and the transfer rollers.

In the image forming apparatus configured to form a color image, when toner of a first color transferred to the sheet (transferred medium) is aggregated, a potential of the corresponding part could be increased. When it is intended to overlap and transfer toner of another color onto the toner of the first color having the increased potential, the toner of the other color would be scattered by the toner of the first color. As a result, the gradation of an image which is formed on the sheet is deteriorated. This problem becomes conspicuous when a charge amount of the toner of the first color is increased (hereinafter, which is referred to as 'charge up') as the toner passes between a downstream photosensitive drum and a transfer roller, and the toner from the photosensitive drum arranged at the most downstream side is transferred with being overlapped onto the toner of the first color.

SUMMARY

Accordingly, an aspect of the present invention provides an image processing device and an image processing method capable of suppressing deterioration of gradation of an image.

According to an illustrative embodiment of the present invention, there is provided an image processing device configured to convert multi-gradation pixels configuring a multi-gradation image of image data to be used in a color image forming apparatus, into unit dither patterns, the image forming apparatus including a plurality of photosensitive members on which developer images are formed by supplying developer to electrostatic latent images, and an exposure device configured to expose the photosensitive members to form the electrostatic latent images, wherein the developer images on the respective photosensitive members are transferred to a transferred medium which is moved while contacting the respective photosensitive members. The image processing device includes a processing unit configured to convert a multi-gradation pixel of a first color into unit dither patterns, each unit dither pattern consisting of a first line extending in a predetermined direction and a second line extending in a direction intersecting with the first line when a gradation value of the multi-gradation pixel is within a predetermined range.

According to another illustrative embodiment of the present invention, there is provided an image processing method of converting multi-gradation pixels configuring a multi-gradation image of image data to be used in a color image forming apparatus, into unit dither patterns, the image forming apparatus including a plurality of photosensitive members on which developer images are formed by supplying developer to electrostatic latent images, and an exposure device configured to expose the photosensitive members to form the electrostatic latent images, wherein the developer images on the respective photosensitive members are transferred to a transferred medium which is moved while contacting the respective photosensitive members. The image processing method includes converting a multi-gradation pixel of a first color into unit dither patterns, each unit dither pattern consisting of a first line extending in a predetermined direction and a second line extending in a direction intersecting with the first line when a gradation value of the multi-gradation pixel is within a predetermined range.

According to this configuration, when the developer image of the first color is transferred to the transferred medium, the developer image forms a lattice-shaped pattern. After that, when transferring the developer of another color onto the developer of the first color with being overlapped, the developer of another color tends to be scattered by the developer of the first color. However, since the developer image of the first color forms the lattice-shaped pattern, an amount of the developer of another color which is scattered toward around the developer of the first color is suppressed, compared to a point-shaped or line-shaped pattern. As a result, it is possible to suppress the deterioration of the gradation of an image which is formed on the transferred medium.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 5 shows a dither matrix for converting a yellow multi-gradation pixel into a dither pattern;

FIG. 6 shows a yellow dither pattern which is formed when a gradation value of the multi-gradation pixel is 64;

FIG. 7 shows a yellow dither pattern which is formed when a gradation value of the multi-gradation pixel is 112;

FIGS. 8A to 8Q show a sequence in which squares of sub-matrices configuring the dither matrix shown in FIG. 5 become ON;

FIG. 11 shows a dither matrix according to a first modified embodiment;

FIGS. 12A to 12C show a sequence in which squares of sub-matrices configuring the dither matrix shown in FIG. 11 become ON;

FIG. 13 shows a dither matrix according to a second modified embodiment;

FIGS. 14A to 14C show a sequence in which squares of sub-matrices configuring the dither matrix shown in FIG. 13 become ON;

FIG. 16 shows a dither matrix according to a fourth modified embodiment;

DETAILED DESCRIPTION

Hereinafter, illustrative embodiments of the present invention will be specifically described with reference to the accompanying drawings. Meanwhile, in the below descriptions, a schematic configuration of a color printer 1 (an example of an image forming apparatus) will be briefly described, and then, image processing (dither processing) will be specifically described.

<Schematic Configuration of Color Printer>

Figure 1:
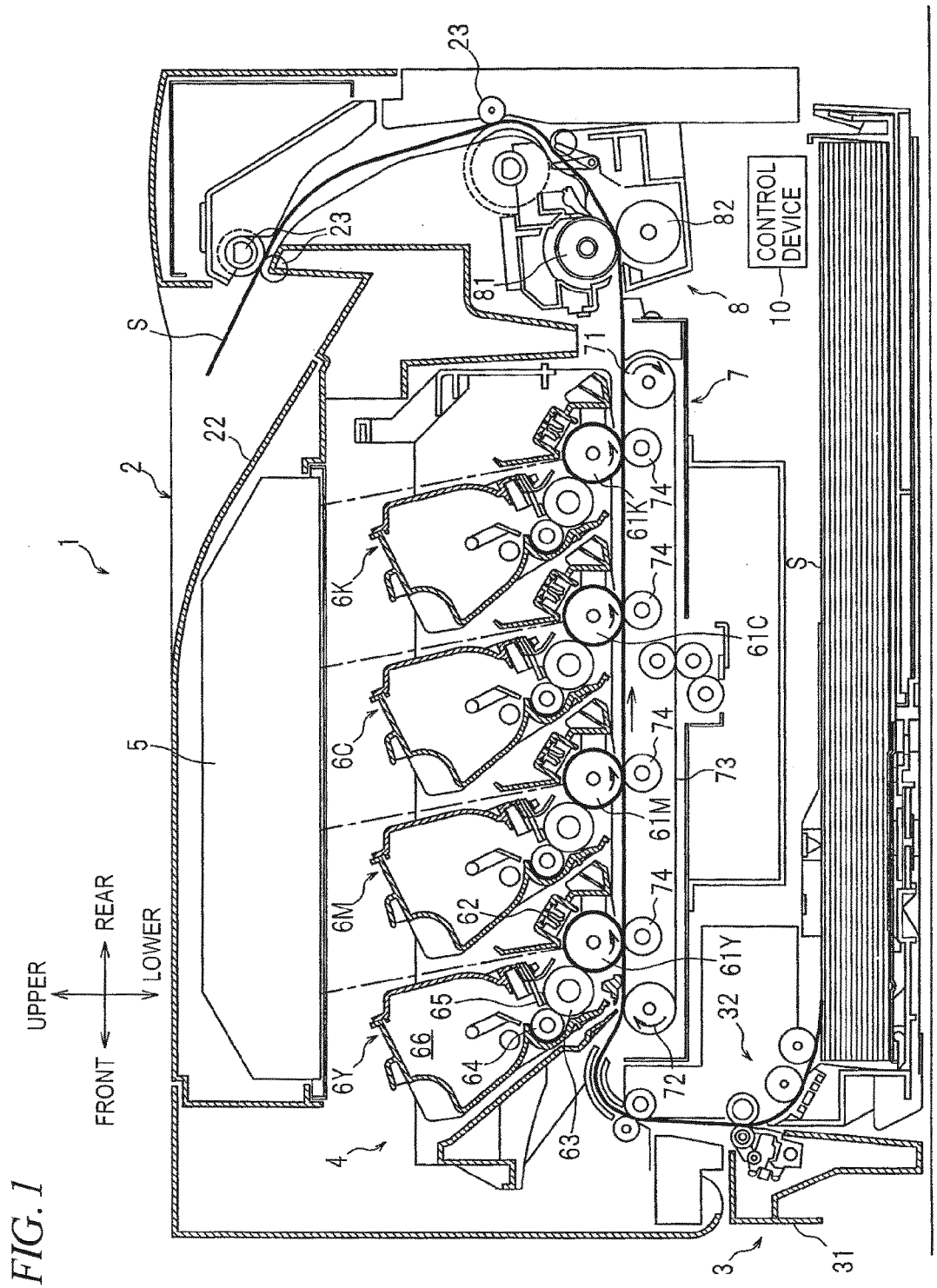
FIG. 1 shows a schematic configuration of a color printer which is an example of an image forming apparatus according to an illustrative embodiment of the present invention.

As shown in FIG. 1, the color printer 1 includes, in a body housing 2, a feeder unit 3 which feeds a sheet S and an image forming unit 4 which forms an image on the fed sheet S. The image forming unit 4 includes an exposure device 5, four process units 6, a transfer unit 7, a fixing unit 8 and a control device 10 (an example of an image processing device).

Meanwhile, in the below schematic descriptions of the color printer 1, the directions are described on the basis of a user who uses the color printer 1. That is, the left of FIG. 1 is referred to as the 'front,' the right of FIG. 1 is referred to as the 'rear,' the front side of FIG. 1 is referred to as the 'right' and the back side of FIG. 1 is referred to as the 'left.' Also, the upper and lower directions of FIG. 1 are referred to as the 'upper and lower.'

The feeder unit 3 is provided at the lower in the body housing 10 and includes a sheet feeding tray 31 which accommodates therein the sheet S (an example of a transferred medium), and a sheet feeding mechanism 32 which feeds the sheet S from the sheet feeding tray 31 to the image forming unit 4. The sheets S in the sheet feeding tray 31 are separated and fed one by one to the image forming unit 4 by the sheet feeding mechanism 32.

The exposure device 5 is provided at the upper in the body housing 2 and includes a plurality of laser light sources (not shown) corresponding to respective colors of yellow, magenta, cyan and black, a polygon mirror, a plurality of lenses, a plurality of reflectors. The laser light sources emit laser lights based on dither pattern data (which will be described later), and the laser lights are reflected on the polygon mirror, the reflectors and the like or pass through the lenses and are then scanned at a high speed on surfaces of respective photosensitive drums 61 (refer to dashed-dotted lines).

The four process units 6 are arranged in parallel in the front-rear direction between the sheet feeding tray 31 and the exposure device 5. Each process unit 50 includes a photosensitive drum 61 (an example of a photosensitive member), a charger 62, a developing roller 63, a supply roller 64, a layer thickness regulation blade 65 and a toner accommodation part 66 which accommodates therein positively chargeable toner (developer).

The process units 6 are arranged side by side from the front side (upstream side of the conveyance direction of the sheet S) in order of the process units 6Y, 6M, 6C, 6K in which yellow, magenta, cyan and black toner (not shown) are respectively accommodated. Meanwhile, in the specification and drawings, when specifying the photosensitive drum 61 and the like in correspondence to the color of the toner, the reference numerals Y, M, C, K are denoted for yellow, magenta, cyan and black, respectively.

The transfer unit 7 is provided between the sheet feeding tray 31 and the process units 6 and includes a driving roller 71, a driven roller 72, an endless conveyance belt 73 which is wound around the driving roller 71, the driven roller 72 and four transfer rollers 74 in a tensioned state. The conveyance belt 73 has an outer surface which abuts on the respective photosensitive drums 61 and the respective transfer rollers 74 are arranged at an inside to sandwich the conveyance belt 73 between the transfer rollers 74 and the photosensitive drums 61.

The fixing unit 8 is provided at the rear of the process units 6 and the transfer unit 7 and includes a heating roller 81 and a pressing roller 82 which is arranged to face the heating roller 81 and presses the heating roller 81.

In the image forming unit 4, the surfaces of the photosensitive drums 61 are uniformly positively charged by the chargers 62 and then exposed by the high-speed scanning of the laser lights emitted from the exposure device 5, so that electrostatic latent images based on print data are formed on the photosensitive drums 61. The toner in the toner accommodation parts 66 is supplied to the developing rollers 63 via the supply rollers 64 and is introduced between the developing rollers 63 and the layer thickness regulation blades 65, so that it is carried on the developing rollers 63 as a thin layer having a predetermined thickness. In this process, the toner is positively friction-charged between the developing rollers 63 and the supply rollers 64 between the developing rollers 63 and the layer thickness regulation blades 65, and the like. Then, the toner carried on the developing rollers 63 is supplied to the electrostatic latent images formed on the photosensitive drums 61, so that the electrostatic latent images become visible and toner images (developer images) are formed on the photosensitive drums 61.

The sheet S which is fed from the feeder unit 3 is moved from the front towards the rear (the one side of the arrangement direction of the photosensitive drums 61) on the conveyance belt 73 with contacting the respective photosensitive drums 61. During this moving, the toner images on the respective photosensitive drums 61 are sequentially transferred with being overlapped onto the sheet S between the photosensitive drums 61 and the transfer rollers 74 to which a transfer bias is applied. The sheet S having the toner images transferred thereto passes between the heating roller 81 and the pressing roller 82, so that the toner images are heat-fixed. Then, the sheet is discharged to the outside from the body housing 2 by conveyance rollers 23 and is placed on a sheet discharge tray 22.

Figure 2:
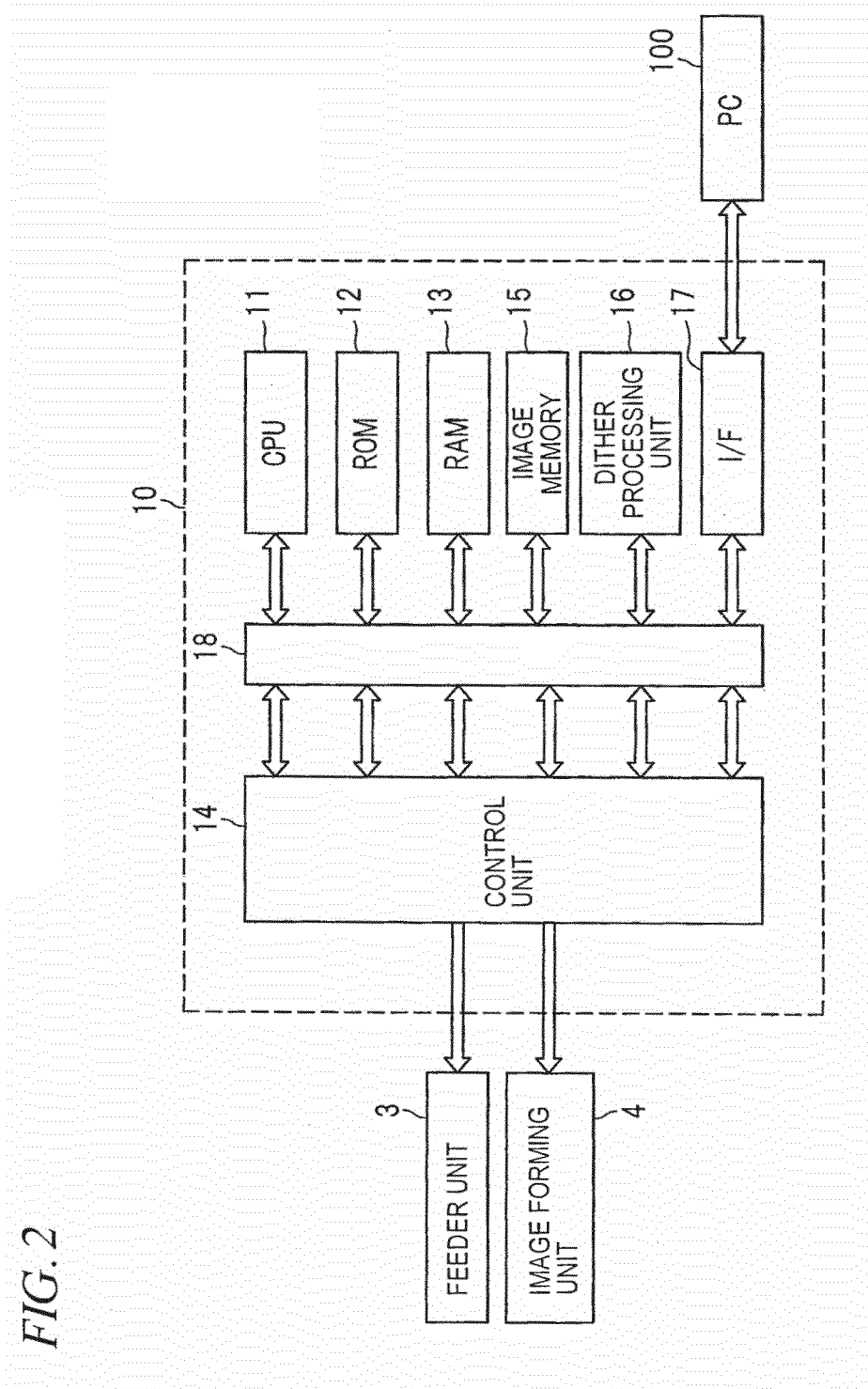
FIG. 2 is a block diagram showing a configuration of a control system of the color printer.

The control device 10 is configured to control the respective units of the color printer 1 and is arranged at an appropriate position in the body housing 2. As shown in FIG. 2, the control device 10 includes a CPU 11, a ROM 12, a RAM 13, a control unit 14 such as ASIC which controls the feeder unit 3 and the image forming unit 4, an image memory 15 which temporarily stores therein image data, a dither processing unit 16, an interface (I/F) 17 for receiving data from an external personal computer (PC) 100 and the like. The respective units are connected to each other via a bus 18.

Here, a printing control (image processing) which is executed by the control device 10 is described with reference to FIGS. 3 and 4. The control device 10 repeatedly executes processing of the flowchart shown in FIG. 3.

Figure 3:
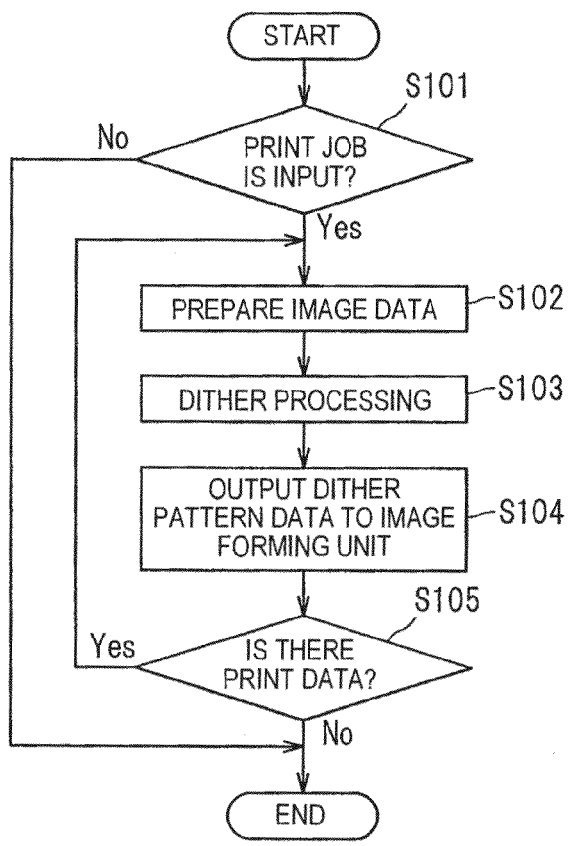
FIG. 3 is a flowchart showing an image processing executed by a control device.
Figure 4A:
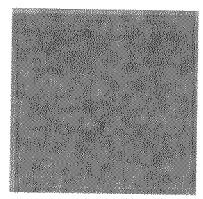
FIGS. 4A to 4C are views for explaining the image processing executed by the control device.
Figure 4B:
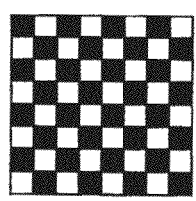
Figure 4C:
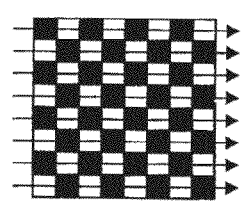

As shown in FIG. 3, the control device 10 determines whether a print job including image data to be printed (hereinafter, referred to as print data) or a print instruction is input from the PC 100 etc. (S101). When a print job is input (S101, Yes), the control device 10 prepares image data from the print data (S102) and stores the image data in the image memory 15. In this illustrative embodiment, the image data is data having a numerical value (0 to 255) of 256 grades for each pixel, which indicates a density of each color of yellow, magenta, cyan and black.

Subsequently, the control device 10 executes a dither processing for the image data (S103). The dither processing is a processing of converting respective multi-gradation pixels configuring a multi-gradation image indicated by the numerical values of 256 grades of the image data shown in FIG. 4A, into data (hereinafter, referred to as dither pattern data) which can be expressed by a pattern of two gradations of ON (toner is put on the sheet S) and OFF (toner is not put on the sheet S) shown in FIG. 4B, for each of the colors.

When the dither processing ends, the control device 10 outputs the dither pattern data to the image forming unit 4 (S104). In the meantime, conceptionally describing the output of the dither pattern data, as shown with arrows in FIG. 4C, the dither pattern data is output to the image forming unit 4 (exposure device 5) in order from an upper side of FIG. 4C for each information of ON/OFF which is included in a line extending in a horizontal direction corresponding to a direction orthogonal to the conveyance direction of the sheet S. The exposure device 5 having received the dither pattern data turns on and off the laser light sources at a high speed, based on the ON/OFF information of the dither pattern data, and scans the surfaces of the photosensitive drums 61 at a high speed to thus expose the photosensitive drums 61, thereby forming electrostatic latent images. After that, the images (toner images) are transferred and heat-fixed on the sheet S, as described above.

After the processing (S102 to S104) of the print data of one page on the sheet S ends, the control device 10 determines whether there is next page print data (S105). When there is next page print data (S105, Yes), the control device 10 returns to step S102 and repeatedly executes the processing of steps S102 to S105 until there is no further print data. On the other hand, when it is determined in step S105 that there is no print data (when the printing ends) (S105, No), the control device 10 ends the processing of the flowchart shown in FIG. 3.

<Dither Pattern Forming Method>

In the below, the details of the dither processing of this illustrative embodiment, that is, an exemplary forming method of an ON/OFF pattern (hereinafter, referred to as dither pattern) is described.

First, a dither pattern forming method for yellow (an example of a first color) which is transferred to the sheet S at the most upstream side in the conveyance direction of the sheet S is described.

In the processing of forming a yellow dither pattern, a dither matrix shown in FIG. 5 is used to set ON/OFF of dots of 600×600 dpi. The dither matrix shown in FIG. 5 has sixteen sub-matrices of 4×4 dots, which corresponds to a unit pattern. A number in each of squares configuring the sub-matrices or dither matrix refers to a threshold value for determining whether to put the toner on a minimum print dot on the sheet S (whether to set ON).

When converting a yellow multi-gradation pixel of the image data into a pattern of two gradations (ON/OFF) by using the dither matrix shown in FIG. 5, when a density (hereinafter, referred to as gradation value) of the 256 grades of the yellow multi-gradation pixel is 64, for example, the squares having a threshold value of 64 or smaller are set ON, so that a line-shaped dither pattern shown in FIG. 6 is formed. Further, when a gradation value of a yellow multi-gradation pixel is 112, for example, the squares having a threshold value of 112 or smaller are set ON, so that a lattice-shaped dither pattern shown in FIG. 7 is formed.

The dither pattern forming method of this illustrative embodiment has a sequence (order) in which the squares of each sub-matrix configuring the dither matrix are set ON. That is, in each sub-matrix, the squares are set ON in sequence shown in FIGS. 8A to 8Q according to a gradation value of a yellow multi-gradation pixel.

More specifically, as shown in FIG. 8A, when the gradation value of the yellow multi-gradation pixel is 0 (zero), all squares configuring a sub-matrix are set OFF. In this case, the yellow toner is not transferred to a portion on the sheet S, which corresponds to the multi-gradation pixel having the gradation value 0.

As the gradation value of the yellow multi-gradation pixel is increased, the squares B, C, D, E are set ON in this order, as shown in FIGS. 8B to 8E, so that a line (hereinafter, referred to as a first line) extending in an upper-lower direction (predetermined direction) of FIG. 8 is formed. When all sub-matrices (unit patterns) become the pattern shown in FIG. 8E, the dither matrix becomes a line-shaped dither pattern as shown in FIG. 6.

When the gradation value of the yellow multi-gradation pixel is further increased, the square F is set ON, as shown in FIG. 8F. Here, according to a relate-art technique, as the gradation value of the yellow multi-gradation pixel is increased, the squares I, L, O, G, J, M, P, H, K, N, Q are set ON in this order, so that the first line becomes thicker towards the right. However, according to this illustrative embodiment, next to the square F, the square G is set ON, as shown in FIG. 8G, so that a line (hereinafter, referred to as a second line) extending in a direction (the left-right direction in FIG. 8) intersecting with (orthogonal to) the first line is formed. Then, as shown in FIG. 8H, the square H is set ON. When all the sub-matrices (unit patterns) become a pattern shown in FIG. 8H, the dither matrix becomes a lattice-shaped dither pattern as shown in FIG. 7.

After that, as the gradation value of the yellow multi-gradation pixel is increased, the squares I, J, K are set ON in this order, as shown in FIGS. 8I to 8K, so that the second line becomes thicker towards the lower direction. In other words, as the squares I, J, K are set ON in this order, the number of second line becomes two. After that, as the gradation value of the yellow multi-gradation pixel is further increased, the squares L, M, N, O, P are set ON in this order, as shown in FIGS. 8L to 8Q. Then, when the gradation value of the yellow multi-gradation pixel is 255 (maximum value), all the squares are set ON, as shown in FIG. 8Q.

As described above, in this illustrative embodiment, when converting a yellow multi-gradation pixel into unit patterns of ON/OFF, if the gradation value of the multi-gradation pixel is smaller than a predetermined range (for example, 17 to 64), the multi-gradation pixel is converted into unit patterns, each consisting of the first line (refer to FIGS. 8C to 8E). On the other hand, when converting a yellow multi-gradation pixel into unit patterns of ON/OFF, if the gradation value of the multi-gradation pixel is within a predetermined range (for example, 81 to 160), the multi-gradation pixel is converted into unit patterns, each consisting of the first line and the second line (refer to FIGS. 8G to 8K).

Referring to FIG. 7, the ON/OFF information of the yellow dither pattern data, which is obtained by converting a yellow multi-gradation pixel of the image data, is output to the exposure device 5 in order from the upper line of FIG. 7. Then, by the exposure or transfer, the yellow toner image having the lattice-shaped pattern shown in FIG. 7 is transferred onto the sheet S from the photosensitive drum 61Y at the most upstream side in the moving direction of the sheet S.

Here, operational effects which are obtained when forming a yellow dither pattern as described above are described with reference to an example where the black toner is transferred with being overlapped onto the yellow toner at the most downstream side in the conveyance direction of the sheet S.

Figure 9A:
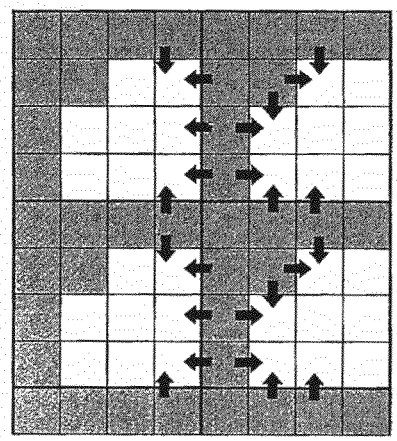
FIGS. 9A and 9B show operational effects of a yellow dither pattern forming method according to an illustrative embodiment.

According to this illustrative embodiment, when a gradation value of a yellow multi-gradation pixel in the image data is a half (i.e., 128) of 256 grades, the yellow toner is transferred in a substantially lattice-shaped pattern (see a hatching part) shown in FIG. 9A to a part on the sheet S, which corresponds to the multi-gradation pixel having the gradation value of 128. On the other hand, according to the method of thickening the first line in the above-described related-art technique, the yellow toner is transferred in a line-shaped pattern shown in FIG. 9B to a part on the sheet, which corresponds to the multi-gradation pixel having the gradation value of 128.

The yellow toner transferred onto the sheet S is gradually charged up when passing between the photosensitive drums 61M, 61C and the transfer rollers 74. When the black toner is transferred with being overlapped onto the yellow toner at the most downstream side, a part of the black toner is scattered by the charged-up yellow toner.

At this time, if the yellow toner image is transferred in the substantially lattice-shaped pattern according to this illustrative embodiment, it is possible to suppress an amount of the black toner which is scattered by the yellow toner toward around the yellow toner, compared to a configuration where the yellow toner image is transferred in the line-shaped pattern, as explained below. Therefore, it is possible to suppress deterioration of the gradation of an image to be formed on the sheet S.

Figure 9B:
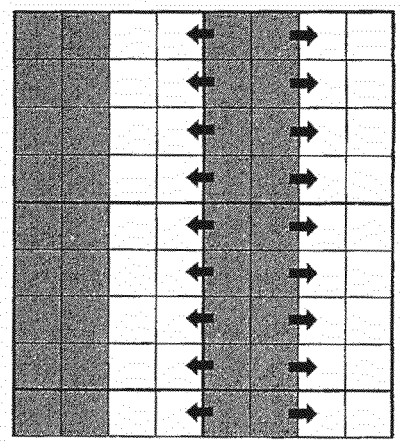

That is, when the yellow toner image is transferred in the substantially lattice-shaped pattern, as shown in FIG. 9A, the black toner is less likely to get out, compared to a configuration where the yellow toner image is transferred in the line-shaped pattern shown in FIG. 9B. Specifically, the black toner tends to enter a corner portion of a space (white background part), which is surrounded by the yellow toner forming the lattice-shaped pattern, from at least two directions. Therefore, the total amount of the black toner is relatively quickly increased at the corner portion. As a result, the corner portion does not serve as a space any more into which the black toner can get out, and therefore, it is supposed that the black toner is less likely to get out. Also, the black toner transferred near an intersection of the lattices is surrounded by the yellow toner and the corner portion. Therefore, it is supposed that there is naturally little space into which the black toner can get out. That is, since the amount (number) of the black toner which is scattered by the yellow toner toward around the yellow toner is suppressed, it is supposed that it is possible to suppress deterioration of the gradation of the image to be formed on the sheet S. Meanwhile, in FIGS. 9A and 9B, an example where the black toner is scattered in the upper-lower and left-right directions is shown with the arrows for the purpose of easy understanding. However, in reality, the black toner can be also scattered in an oblique direction.

In this illustrative embodiment, when the gradation value of the multi-gradation pixel is smaller than a predetermined range, the multi-gradation pixel is converted into unit patterns, each consisting of the first line (for example, refer to FIG. 6). However, since the yellow toner image on the sheet S formed at this time is a very thin line, this color is less conspicuous on the sheet S. Therefore, even though the black toner is scattered, which is transferred onto the yellow toner, the deterioration of the gradation of the image is less problematic. This is similar in the case of the related-art technique when the gradation value of the multi-gradation pixel is small. However, according this illustrative embodiment, particularly when the gradation value of the multi-gradation pixel is within the predetermined range, the multi-gradation pixel is not converted into the unit patterns in which the first line is thickened but converted into the unit patterns, each consisting of the first line and the second line. Thereby, it is possible to suppress the deterioration of the gradation of the image, compared to the related-art technique.

Meanwhile, in this illustrative embodiment, when the gradation value of the multi-gradation pixel is smaller than the predetermined range, the multi-gradation pixel is converted into the unit patterns, each consisting of the first line. Therefore, the yellow toner image is transferred onto the sheet S, as a line-shaped pattern. The black toner which is transferred thereafter tends to be scattered by the yellow toner. However, since the yellow toner image forms the line-shaped pattern, the space on the sheet S into which the black toner can get out is limited, compared to a configuration where a dot-shaped pattern is formed. Therefore, the amount of the black toner to scatter is suppressed. Also, since the yellow toner transferred in the line shape (band shape) is less likely to aggregate (a layer thickness per unit area is small), compared to the configuration where the yellow toner is transferred in the dot shape, a potential thereof is less likely to increase. Therefore, it is supposed that the amount of the black toner to be scattered is suppressed. Due to the above reasons, even when the gradation value of the multi-gradation pixel is smaller than the predetermined range, the deterioration of the gradation can be suppressed although the deterioration of the gradation is not naturally conspicuous.

In this illustrative embodiment, a dither pattern of a color (base color) onto which another color is transferred with being overlapped is formed in the same manner as the case of the yellow toner. Therefore, for example, when the cyan toner is transferred with being overlapped onto the magenta toner, the magenta multi-gradation pixels of the image data are formed as the dither pattern as shown in FIG. 6 or 7 by the dither matrix as shown in FIG. 5.

Subsequently, the dither processing is described which is executed when the image data is data of the multi-gradation image for causing a toner of a second color (for example, black) to be transferred with being overlapped onto the yellow toner image transferred on the sheet S prior to the toner of the second color and when the black multi-gradation pixel is converted into an ON/OFF pattern.

The yellow (base color) dither pattern is formed by the above-described method and the yellow toner image forming the same pattern as the formed dither pattern (refer to FIGS. 6 and 7) is transferred on the sheet S from the photosensitive drum 61Y at the most upstream side in the conveyance direction of the sheet S.

The black dither pattern is formed as a line-shaped pattern consisting of 200 lines per 1 inch (25.4 mm) by a known method. In the pattern, each line is thickened as the gradation value becomes larger. In this illustrative embodiment, when converting the black multi-gradation pixel into unit patterns of ON/OFF, the multi-gradation pixel is converted into unit patterns, each consisting of a line extending in a direction intersecting with both the first line and the second line. Specifically, each line configuring the black dither pattern is formed such that it is inclined at 45 degrees (for example) with respect to the dither matrix shown in FIG. 5 for converting the yellow multi-gradation pixels into a dither pattern.

Figure 10A:
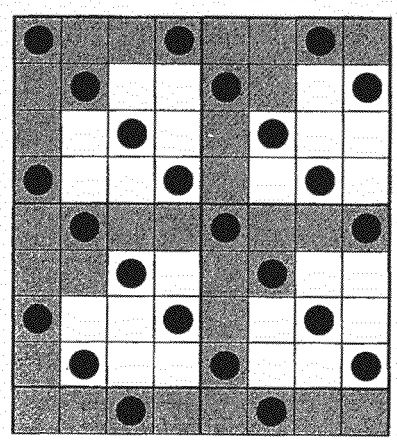
FIGS. 10A to 10D show operational effects of a black dither pattern forming method according to an illustrative embodiment.

The formed black dither pattern (dither pattern data) is output to the exposure device 5. Then, by the exposure and transfer, a black toner image forming a line-shaped pattern shown with black solid circles of FIG. 10A is transferred onto the sheet S from the photosensitive drum 61K at the most downstream side in the moving direction of the sheet S. Each line configuring the black toner image on the sheet S intersects with a line (which corresponds to the first line) extending in the upper-lower direction and a line (which corresponds to the second line) extending in the left-right direction, which configure the yellow toner image, at an inclination of 45 degrees.

Figure 10B:
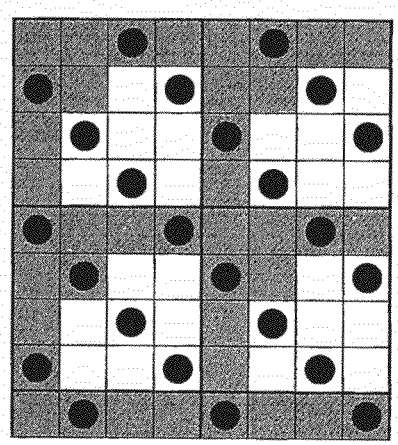
Figure 10C:
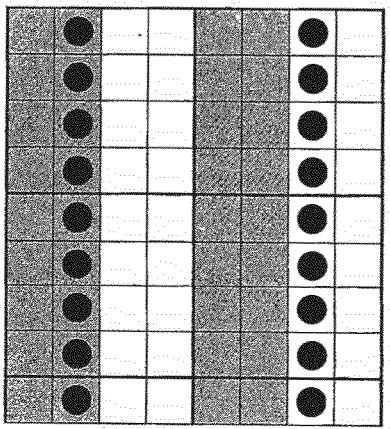
Figure 10D:
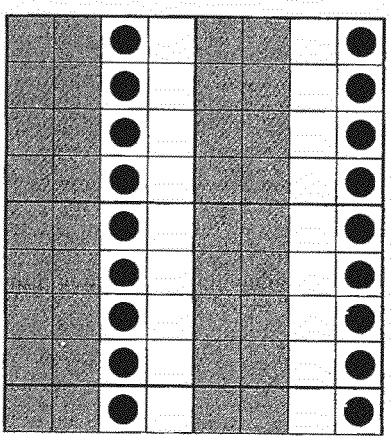

As the black dither pattern is formed as described above, it is possible to suppress a change in a tone of the image that is formed on the sheet S. More specifically, as shown in FIGS. 10C and 10D, if each line configuring the black toner image is transferred to extend in the same direction as the line (for example, line extending in the upper-lower direction) configuring the yellow toner image, when a relative position between the yellow toner and the black toner is deviated, an area of a part in which the yellow toner and the black toner overlap is changed, so that a tone of the image may be changed. On the other hand, as shown in FIGS. 10A and 10B, in this illustrative embodiment, the lines configuring the black toner image intersect with the lines configuring the yellow toner image. Thus, even when a relative position between the yellow toner and the black toner is deviated, it is possible to reduce a change in an area of a part in which the yellow toner and the black toner overlap, compared to the configuration of FIGS. 10C and 10D. As a result, it is possible to suppress the change in the tone of the image.

In this illustrative embodiment, when transferring the toner of three colors or more with being overlapped, the dither patterns of the respective colors are formed by the above-described principle while the lines configuring the dither patterns of the respective colors intersect with each other.

While the present invention has been shown and described with reference to certain illustrative embodiments thereof, it will be understood by those skilled in the art that various changes in form and details may be made therein without departing from the spirit and scope of the invention as defined by the appended claims.

The specific configurations (the sequence in which the squares become ON, the number of squares and the like) of the dither matrix described in the above-described illustrative embodiment are just exemplary and the present invention is not limited to the configurations of the illustrative embodiment.

For example, the dither matrix for forming the yellow dither pattern may be a dither matrix shown in FIG. 11. The dither matrix shown in FIG. 11 is configured such that the squares of each sub-matrix configuring the dither matrix are set ON in sequence of the numbers 1 to 16 shown in FIGS. 12A to 12C. Specifically, first, as shown in FIG. 12A, a first line extending in the left-right direction in FIG. 12 is formed. Then, as shown in FIG. 12B, a second line extending in the upper-lower direction orthogonal to the first line is formed. Thereafter, as shown in FIG. 12C, the squares 8 and 9 are set ON in this order, so that the second line is thickened (the number of the second line becomes two). Thereafter, the squares 10 to 16 are set ON in this order. That is, the dither matrix described in the above-described illustrative embodiment (refer to FIG. 5) is set such that the first line extends in the upper-lower direction and the second line extends in the left-right direction. However, the dither matrix shown in FIG. 11 is set such that the first line extends in the left-right direction and the second line extends in the upper-lower direction.

Also, the dither matrix for forming the yellow dither pattern may be a dither matrix shown in FIG. 13. The dither matrix shown in FIG. 13 is configured such that the squares of each sub-matrix configuring the dither matrix are set ON in sequence of the numbers 1 to 16 shown in FIGS. 14A to 14C. Specifically, first, as shown in FIG. 14A, a first line extending in the upper-lower direction is formed. Then, as shown in FIG. 14B, a second line of the first extending in the oblique right-lower direction intersecting with the first line is formed. Thereafter, as shown in FIG. 14C, the squares 8 and 9 are set ON in this order, so that the second line is thickened (the number of the second line becomes two). Thereafter, the squares 10 to 16 are set ON in this order. That is, the dither matrix described in the above-described illustrative embodiment (refer to FIG. 5) or shown in FIG. 11 is set such that the second line extends in the direction orthogonal to the first line. However, the dither matrix shown in FIG. 13 is set such that the second line intersects with the first line at an angle smaller than 90 degrees.

Figures 15A, 15B, 15C:
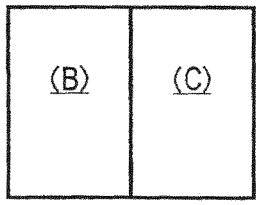
FIGS. 15A to 15C show a dither matrix according to a third modified embodiment.

Further, when the color printer 1 is configured to form an image of a high resolution (when the exposure device 5 is configured to separately expose sections of one square configuring the dither matrix), it may be possible to divide one square configuring the matrix and to allot a threshold value (a sequence in which the squares become ON) to each of the divided areas. Specifically, the dither matrix for forming the yellow dither pattern may be a dither matrix shown in FIGS. 15A to 15C. Here, the dither matrix shown in FIGS. 15A to 15C has a configuration where a matrix shown in FIG. 15B is arranged at a left side shown in FIG. 15A and a matrix shown in FIG. 15C is arranged at a right side shown in FIG. 15A. The dither matrix shown in FIG. 15A to 15C is for setting ON/OFF of the dots of 600×4800 dpi and has a rectangular shape where eight sub-matrices of 3×3 in case of 600×600 dpi, which corresponds to a unit pattern are arranged by four in the vertical direction and by two in the horizontal direction. One square configuring the sub-matrix is allotted with eight threshold values. For example, when a gradation value of a yellow multi-gradation image is 1 (one), a first line in which a ⅜ area from the left of the most leftward square of each sub-matrix is set ON and which extends in the upper-lower direction is formed and a line-shaped dither pattern as a whole is formed. Further, when a gradation value of a yellow multi-gradation image is between 2 to 35, the first line becomes first thicker in the right direction, and then a second line extends in the right direction. When a gradation value of a yellow multi-gradation image is 149, a lattice-shaped dither pattern as a whole is formed.

Further, the dither matrix for a high resolution for forming the yellow dither pattern may be a dither matrix shown in FIG. 16. The dither matrix shown in FIG. 16 is for setting ON/OFF of dots of 1200×1200 dpi and has a rectangular shape where eight sub-matrices of 8×8, which corresponds to a unit pattern are arranged by four in the vertical direction and by two in the horizontal direction. The dither matrix is set such that a lattice-shaped dither pattern is formed when a gradation value of a yellow multi-gradation image is 1 (one) (within the predetermined range) and such that as a gradation value of a yellow multi-gradation image is increased, vertical and horizontal lines configuring the lattice are thickened towards the most right-lower square of each sub-matrix.

In the above-described illustrative embodiment, when converting a yellow multi-gradation pixel into unit patterns of ON/OFF, when the gradation value of the multi-gradation pixel is smaller than the predetermined range, the multi-gradation pixel is converted into the unit patterns, each consisting of the first line. However, the present invention is not limited thereto. For example, when converting a yellow multi-gradation pixel into unit patterns of ON/OFF, if the gradation value of the multi-gradation pixel is smaller than the predetermined range, the multi-gradation pixel may be converted into unit patterns, each consisting of dots.

In the above-described illustrative embodiment, the photosensitive drums 61Y, 61M, 61C, 61K are arranged side by side in this order from the upstream side in the conveyance direction of the sheet S. However, the present invention is not limited thereto. In other words, the arrangement order of the photosensitive members (arrangement of colors) is arbitrary in the present invention. Also, in the above-described illustrative embodiment, the yellow is exemplified as the first color and the black is exemplified as the second color different from the first color. However, the present invention is not limited thereto. That is, the other combinations may be also possible. For example, the first color may be yellow and the second color may be cyan, the first color may be magenta and the second color may be black, and the first color may be magenta and the second color may be cyan.

In the above-described illustrative embodiment, the exposure device 5 is configured to illuminate the laser lights at a high speed to expose the photosensitive drums 61 (photosensitive members). However, the present invention is not limited thereto. For example, the exposure device may be a unit which is provided in correspondence to each photosensitive member and includes an LED print head having a plurality of flashing on and off units at a part opposing the photosensitive member.

In the above-described illustrative embodiment, the sheet S is exemplified as the transferred medium. However, the present invention is not limited thereto. For example, the transferred medium may be a so-called intermediate transfer belt and the like. In other words, the present invention is not limited to the printer which directly transfers the developer image on the photosensitive member to the sheet and can be also applied to an intermediate transfer-type printer. Also, the present invention can be applied to a four-cycle type printer.

In the above-described illustrative embodiment, the color printer 1 (printer) is exemplified as the image forming apparatus. However, the present invention is not limited thereto. For example, the image forming apparatus may be a copier, a multi-function machine and the like having a document reading device such as flat bed scanner. Also, in the above-described illustrative embodiment, the image forming apparatus using the positively chargeable toner (developer) is exemplified. However, the present invention is not limited thereto. That is, the present invention can be also applied to an image forming apparatus using negatively chargeable toner.

In the above-described illustrative embodiment, the control device 1 which is provided in the color printer 1 (image forming apparatus) is exemplified as the image processing device. However, the present invention is not limited thereto. For example, the image processing device may be an external personal computer or a server which outputs a print job to the image forming apparatus. Also, the present invention can be configured as a program enabling a computer to execute the above-described image processing method.

EXAMPLES

In the below, an example for confirming the effects of the present invention is described.

In this example, the gradation of an image was evaluated which was obtained by transferring the black toner with solid of a constant density (gradation value 255), onto the yellow toner image which was transferred on the sheet based on a dither pattern (dither pattern data) which will be described later. The specific method is detailed as follows.

<Dither Pattern Forming Method>

Figure 17A:
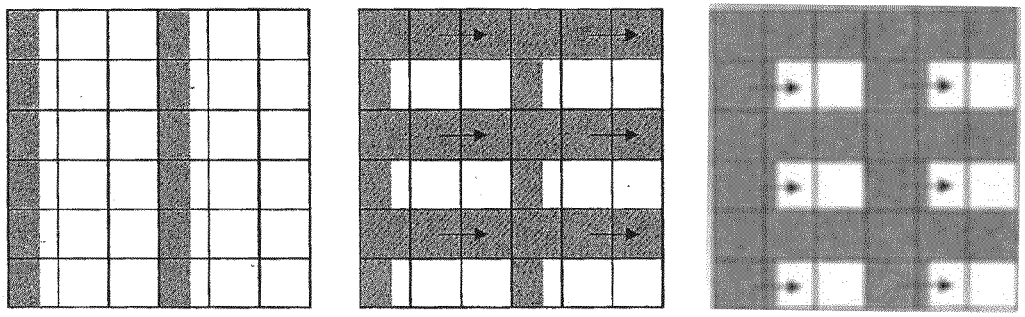
FIG. 17A shows a dither pattern forming method of an example.

In an example 1, when a gradation value of a yellow multi-gradation pixel is smaller than a predetermined range, the multi-gradation pixel is converted into a pattern consisting of the first line, and when the gradation value is within the predetermined range, the multi-gradation pixel is converted into a pattern consisting of the first line and the second line, similarly to the above-described illustrative embodiment. More specifically, in the example 1, the dither matrix as shown in FIG. 15 is used. First, as shown in the left of FIG. 17A, a dither pattern consisting of the first lines extending in the upper-lower direction in FIG. 17A is formed. The first lines are formed by 200 lines per one inch and are thickened in the right direction in FIG. 17A by 4800 dpi as the gradation value is increased. After a ⅝ area from the left of the most leftward square of each sub-matrix is set ON, the second lines extending in the right direction are formed as the gradation value is increased, so that a lattice-shaped pattern shown in the center of FIG. 17A is formed. After that, as the gradation value is increased, the OFF squares are sequentially set ON, as shown in the right of FIG. 17A.

Figure 17B:
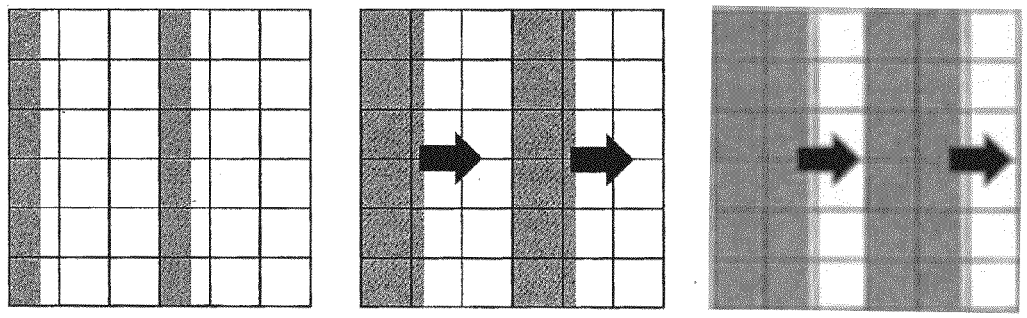
FIGS. 17B and 17C show dither pattern forming methods of comparative examples.

In a comparative example 1, a line-shaped dither pattern is formed. Specifically, as shown in the left of FIG. 17B, the lines extending in the upper-lower direction are formed by 200 lines per one inch. As the gradation value is increased, each line is thickened in the right direction by 4800 dpi, as shown in the center or right of FIG. 17B.

Figure 17C:
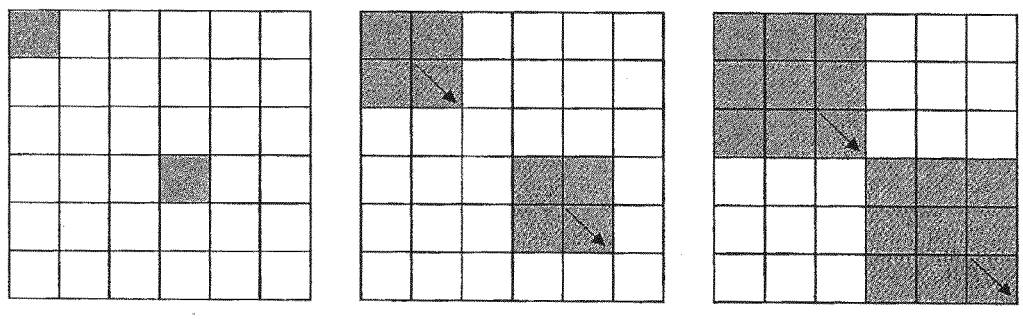

In a comparative example 2, a dot-shaped dither pattern is formed. Specifically, as shown in the left of FIG. 17C, dot rows are formed such that dot rows lined in the upper-lower direction become 200 rows per one inch. Also, dot rows lined in the oblique direction are formed at 45 degrees with respect to the dot rows lined in the upper-lower direction and the left-right direction and are formed by about 141 rows per one inch. As the gradation value is increased, each dot is enlarged in the oblique right-lower direction with 600 dpi, as shown in the center or right of FIG. 17C.

<Evaluation of Gradation>

The gradation was evaluated by a difference between brightness of an image, which is obtained by transferring only the black toner with a solid printing of a constant density, and brightness of an image, which is obtained by transferring the black toner with a solid printing onto the yellow toner image transferred on the sheet based on the above dither pattern. If the brightness difference is great, it can be said that an amount of the black toner which is scattered by the yellow toner is relatively large since the base yellow (bright color) is seen even though the black solid printing is performed. On the other hand, if the brightness difference is small, it can be said that an amount of the black toner which is scattered by the yellow toner is relatively small since the base yellow is little seen. That is, it can be said that the deterioration of the gradation is suppressed. In the meantime, the brightness of the image is measured by a spectrophotometer 938 (made by X-rite, Incorporated) (L*a*b display system).

<Results>

Figure 18:
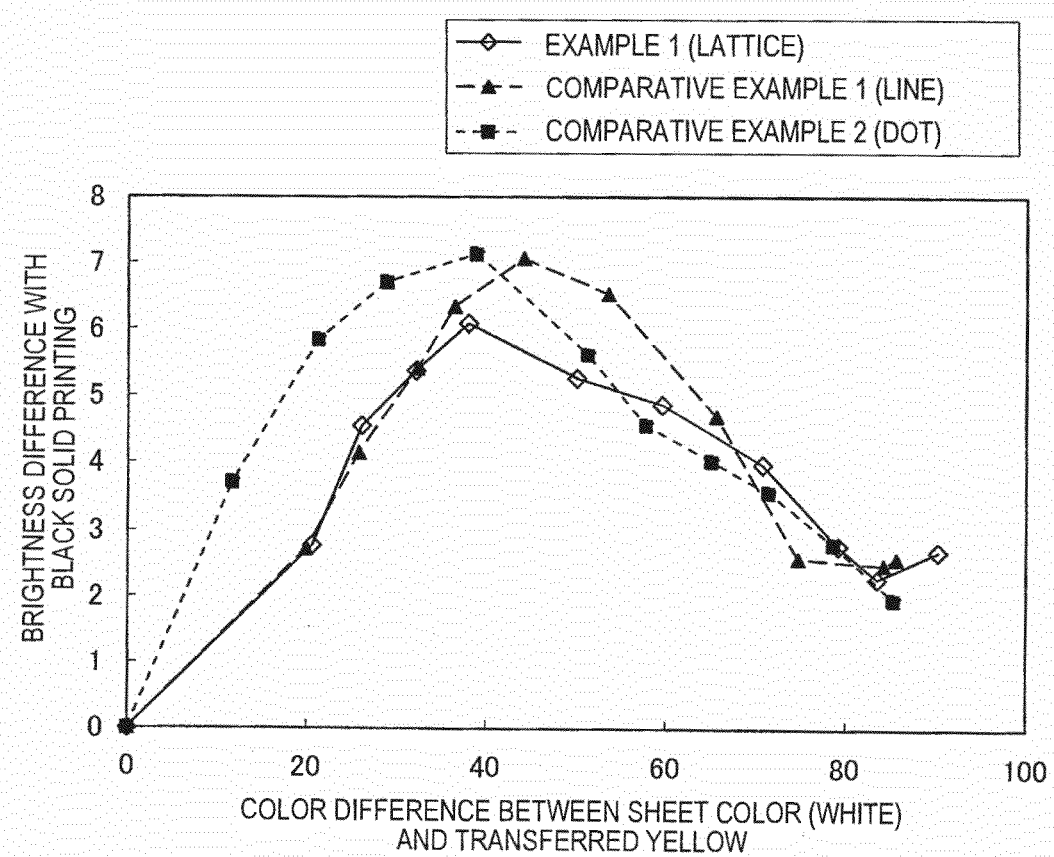
FIG. 18 is a graph showing a measurement result of the examples for confirming the effects of an illustrative embodiment of the present invention.

FIG. 18 is a graph in which measurement results (brightness differences) are plotted. Here, a horizontal axis indicates a color difference between a color (white) of the sheet and a color of the toner image (yellow) transferred on the sheet and means that the larger the value, the larger a ratio of the yellow occupying the color (white) of the sheet (the closer the yellow solid printing of a constant density).

As shown in FIG. 18, the graphs of the example 1 and the comparative examples 1 and 2 have mountain shapes in which the centers thereof are high. The reason is considered as follows. That is, when the color difference is small (the gradation value of the yellow multi-gradation pixel is small), the amount of the yellow toner transferred on the sheet is small. Hence, even though the black toner transferred onto the yellow toner is scattered, the effect thereof is less likely to be exhibited. On the other hand, when the color difference is large (the gradation value of the yellow multi-gradation pixel is large), since the amount of the yellow toner transferred on the sheet is large, the space into which the black toner can get out is limited. Hence, even though the black toner is scattered, the effect thereof is also less likely to be exhibited.

When the color difference is small, the example 1 and the comparative example 1 in which the line-shaped dither pattern is formed in the image processing has the smaller bright difference, compared to the comparative example 2 in which the dot-shaped dither pattern is formed. From this result, it could be confirmed that when converting the yellow multi-gradation pixel into the dither pattern, the deterioration of the gradation of the image can be suppressed by converting the multi-gradation pixels into the pattern consisting of the line (first line) when the gradation value of the multi-gradation pixel is smaller than the predetermined range, compared to the conversion into the dot-shaped pattern.

Meanwhile, when the color difference is about 40 to 60, it can be seen that the example 1 in which the lattice-shaped dither pattern consisting of the first line and the second line is formed in the image processing has the smaller brightness difference, compared to the comparative example 1 in which the dither pattern consists of only the line. From this result, it could be confirmed that when converting the yellow multi-gradation pixel into the dither pattern, the deterioration of the gradation of the image can be suppressed by converting the multi-gradation pixel into the pattern consisting of the first line and the second line when the gradation value of the multi-gradation pixel is within the predetermined range, compared to the conversion into the pattern consisting of only the line.

What is claimed is:

1. An image processing device configured to convert multi-gradation pixels configuring a multi-gradation image of image data to be used in a color image forming apparatus, into unit dither patterns, the image forming apparatus including a plurality of photosensitive members on which developer images are formed by supplying developer to electrostatic latent images, and an exposure device configured to expose the photosensitive members to form the electrostatic latent images, wherein the developer images on the respective photosensitive members are transferred to a transferred medium which is moved while contacting the respective photosensitive members, the image processing device comprising:

a processing unit configured to convert a multi-gradation pixel of a first color into unit dither patterns, each unit dither pattern consisting of a first line extending in a predetermined direction by a first length according to a gradation value of the multi-gradation pixel and a second line extending in a direction intersecting with the first line by a second length according to the gradation value of the multi-gradation pixel when a gradation value of the multi-gradation pixel is within a predetermined range, wherein in a case where the image data is for causing a developer image of a second color different from the first color to be overlapped onto a developer image of the first color transferred on the transferred medium prior to the developer image of the second color, the processing unit converts a multi-gradation pixel of the second color into unit dither patterns, each unit dither pattern including a line extending in a direction intersecting with both the first line and the second line.

2. The image processing device according to claim 1, wherein the processing unit is further configured to convert a multi-gradation pixel of the first color into unit dither patterns, each unit dither pattern consisting of the first line when the gradation value of the multi-gradation pixel is smaller than the predetermined range.

3. An image processing method of converting multi-gradation pixels configuring a multi-gradation image of image data to be used in a color image forming apparatus, into unit dither patterns, the image forming apparatus including a plurality of photosensitive members on which developer images are formed by supplying developer to electrostatic latent images, and an exposure device configured to expose the photosensitive members to form the electrostatic latent images, wherein the developer images on the respective photosensitive members are transferred to a transferred medium which is moved while contacting the respective photosensitive members, the image processing method comprising:

converting a multi-gradation pixel of a first color into unit dither patterns, each unit dither pattern consisting of a first line extending in a predetermined direction by a first length according to a gradation value of the multi-gradation pixel and a second line extending in a direction intersecting with the first line by a second length according to the gradation value of the multi-gradation pixel when a gradation value of the multi-gradation pixel is within a predetermined range, in a case where the image data is for causing a developer image of a second color different from the first color to be overlapped onto a developer image of the first color transferred on the transferred medium prior to the developer image of the second color, converting a multi-gradation pixel of the second color into unit dither patterns, each unit dither pattern including a line extending in a direction intersecting with both the first line and the second line.

4. The image processing method according to claim 3, further comprising:

converting a multi-gradation pixel of the first color into unit dither patterns, each unit dither pattern consisting of the first line when the gradation value of the multi-gradation pixel is smaller than the predetermined range.

* * * * *